Aug. 16, 1927.
F. PALM
1,638,873
AXLE HOUSING AND GEAR CASING FOR AUTOMOBILES AND METHOD OF MAKING THE SAME
Filed May 20, 1926
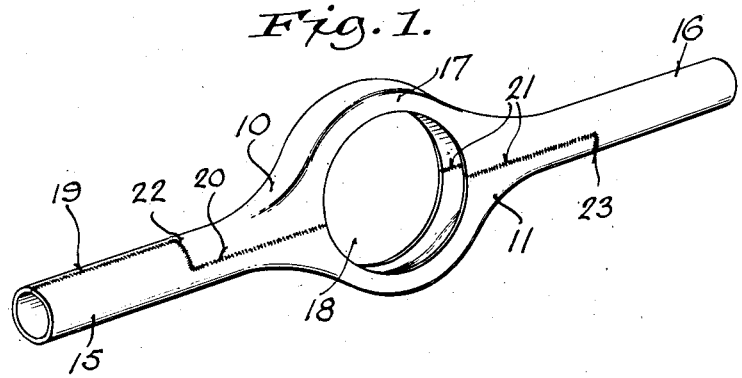
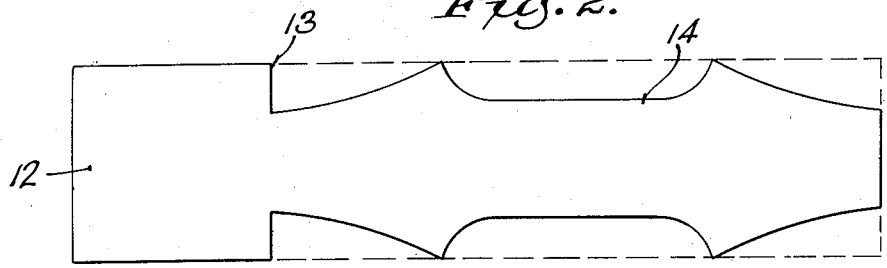
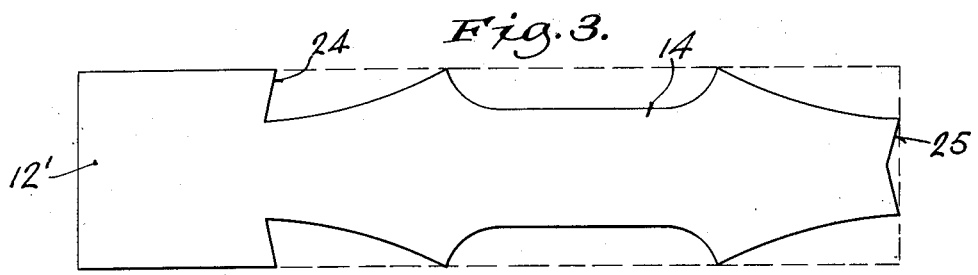
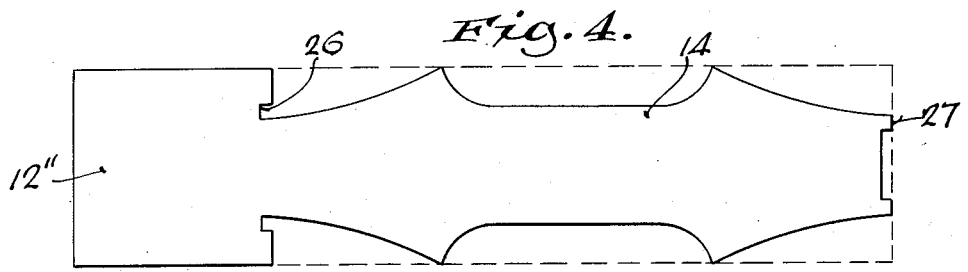
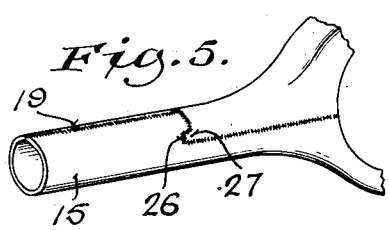
INVENTOR.
FREDERICK PALM
BY
ATTORNEYS.

Patented Aug. 16, 1927.

1,638,873

UNITED STATES PATENT OFFICE.

FREDERICK PALM, OF SHOREWOOD, WISCONSIN, ASSIGNOR TO A. O. SMITH CORPORATION, OF MILWAUKEE, WISCONSIN, A CORPORATION OF NEW YORK.

AXLE HOUSING AND GEAR CASING FOR AUTOMOBILES AND METHOD OF MAKING THE SAME.

Application filed May 20, 1926. Serial No. 110,370.

The invention relates to an improved construction of tubular rear axle housing and differential gear casing for automobiles and differs from those produced in accordance with known methods in the particular that the manufacturing operations are simplified and the material cost is greatly reduced.

As now manufactured, housings of this type are produced from two complemental shell members of like formation drawn from sheet metal, each member being of the full length of the housing, and welded together along the lines of their meeting edges at opposite sides in the plane of the neutral axis of the housing. But the present invention embodies some novel features which contribute to the economies above mentioned.

The present invention resides in an axle housing composed of two members of like but novel formation, each having a length which is less than that of the whole, but which are assembled and united in such manner as to impart the required over all length thereto. Such members have a channel or groove section at one end of which is an integral tubular section, the channel sections being open at the top with the middle portion thereof being displaced at one side, so that when the two like members are assembled with the meeting edges of the open sections in alignment, there is formed a housing with tubular portions at its ends, and an intermediate widened portion with an enlarged through opening, in which the differential gears may be arranged. The parts are welded at their meeting lines so as to constitute an integral structure of great strength.

The novel features of the invention will be pointed out in the appended claims, following the specific description of the same which will now be made.

In the accompanying drawing:

Figure 1 is a perspective view of a housing constructed in accordance with my invention.

Fig. 2 is a plan view of a contoured blank, two of which properly drawn into shape are assembled to make the housing in Figure 1.

Fig. 3 is a like view of a blank for the same purpose, slightly modified in outline, so as to supplement the welding by interlocking the abutting ends of the two members of the housing so as to insert a greater resistance to load stresses.

Fig. 4 is a similar view showing a modification in the formation of the locking means.

Fig. 5 is a perspective view showing a portion of a housing produced from blanks contoured as in Fig. 4.

In the drawing, Figure 1 shows my improved housing composed of two members 10 and 11, each drawn from a blank 12, contoured as shown in Fig. 2. In the drawing operation, the squared area 13 of the blank shown at the left in Fig. 2 is converted into a tube, while the remaining symmetrically contoured portion 14 of the blank is drawn into an open channel or trough-like section, displaced or depressed at its middle part from the plane of the longitudinal center line, which is the axis of the tubular portion and the neutral axis of the housing. By assembling two of such drawn members 10 and 11 in the manner shown in Figure 1, that is, one reversely arranged upon the other, with the meeting edges of the channel portions aligned and the open end of one member abutting the shoulder formed by the tubular portion of the other, the housing illustrated is produced, such housing having at its ends tubular portions 15 and 16, and an intermediate vertically widened central portion 17 with an enlarged through opening 18 in which the differential may be assembled.

The tubular portions 15 and 16 at the ends of the members 10 and 11 are first welded as at 19 on the longitudinal line of their meeting edges, one on the upper side and the other on the lower, and the meeting edges of the open or channel portions are then welded longitudinally on the lines 20 and 21, at both sides. Finally, the transverse abutting lines extending in partial circumference about the housing are welded as at 22 and 23, to produce an integral structure of great strength. This result follows from the fact that the present development of the art of arc welding permits the formation of a joining line between metal parts which in itself has a strength greater than that of the materials in which the welded joint is formed.

Although the method of arc welding employed in uniting the members 10 and 11 is such as to impart maximum strength to the housing, such welding may be augmented in a manner which will interpose a resistance to vertical strains imposed by the load, by providing an interlocking connection crossing a line perpendicular to the axis of the housing where the parts have an abutting relation, as where the end of one member engages under a projection formed on the tubular portion of the other. Such locking may be effected in the simple manner shown in Fig. 3, in which the blank 12' is formed so that the projection 24 on the tubular portion of one member will slightly overhang the abutting end of the other member, such other end being formed with a taper 25 which will engage under the overhanging projection. Or the same result may be effected by notching the blank 12'', as at 26, and providing keys 27 upon the other end of the blank to engage in the notches 26, when the two members of the housing are assembled.

In all the forms illustrated, the members are welded throughout at all of their meeting lines so as to unite them into an integral structure such as is shown in Figure 1. The waste or scrap produced in blanking is reduced to a minimum, the extent of which is indicated by the marginal portions lying outside the contour lines of the blanks and within the dotted outlines shown in Figs. 2, 3 and 4. A single set of blanking dies will produce the blanks for the two parts members 10 and 11 of the housing, and likewise a single set of drawing dies will be sufficient, inasmuch as the said members are exact duplicates.

Having thus described my invention, what I claim and desire to secure by Letters Patent of the United States, is:

1. An axle housing composed of two pressed sheet metal members each of less length than that of the housing as a whole, each such member having a tubular portion at one end and an open channel or trough-like portion at the other, the members being assembled with the edges of their channel portions in alignment, and welded along their meeting lines to form an integral structure.

2. An axle housing composed of two pressed sheet metal members of less length than that of the housing as a whole, each such member having a tubular portion at one end and an open channel or trough-like portion at the other, the members being assembled with the edges of their channel portions in alignment and the open end of one portion abutting the tubular portion of the other, the two members being welded along their meeting lines to constitute an integral structure.

3. An axle housing composed of two pressed sheet metal complemental members of less length than that of the housing which they constitute, each such member having a tubular portion at one end and an open channel at the other, the members being assembled with the edges of their channel portions in alignment in the plane of the axis of the housing, and the open end of one member abutting the tubular portion of the other, the two members being welded along their meeting lines to form an integral structure.

4. An axle housing and gear casing composed of two pressed sheet metal members of like formation and of less length than that of the housing which they constitute, each such member having at one end a tubular portion and at the other an open channel, the metal of the channel portions being displaced laterally from the axial plane of the tubular portion to provide a gear casing, the said members being assembled with the edges of the channel portions in alignment in the said axial plane, and the open end of one member abutting the end of the tubular portion of the other, the two members being welded along their meeting lines to form an integral structure.

5. An axle housing and gear casing composed of two pressed sheet metal members of like formation and of less length than that of the housing which they constitute, each such member having at one end a tubular portion welded along the line of the meeting edges of the part of the blank of which it is formed and at the other end an open channel portion, the metal of the latter being displaced intermediate its ends from the plane of the tubular portions, the said members being assembled with their edges in alignment, and the open end of one member abutting the tubular portion of the other, the two members being welded along their meeting lines to form an integral structure.

6. An axle housing and gear casing composed of two pressed sheet metal members of like formation and of less length than that of the housing which they constitute, each such member having at one end a tubular portion welded along the line of the meeting edges of the part of the blank of which it is formed and at the other end an open channel portion, the metal of the latter being displaced intermediate its ends from the plane of the tubular portions, the said members being assembled with their edges in alignment, and the open end of one member abutting the tubular portion of the other, the two members being welded along their meeting lines to form an integral structure having tubular portions at its opposite ends, and an intermediate enlargement to receive the differential.

7. The process of making axle housings, which comprises the steps of blanking two metal strips of a length less than that of the housing, drawing such strips to produce sections each having a tubular portion at one end and a channel portion at the other, assembling the sections one in reverse relation to the other with the edges of the channel portions in alignment and the outer ends of the channel portions abutting the inner ends of the tubular portions upon the other, and welding the sections at their meeting lines to constitute an integral tubular structure.

8. The process of making axle housings, which comprises the steps of blanking two metal strips of a length less than that of the housing, drawing such strips to produce sections each having a tubular portion at one end and a channel portion at the other, deflecting the channel portions intermediate their ends to provide a through opening in the housing, assembling the sections one in reverse relation to the other with the contacting edges of the channel portions in alignment and the outer ends of the channel portions abutting the inner ends of the tubular portions upon the other, and welding the sections at their meeting lines to constitute an integral tubular structure.

9. The process of making axle housings, which comprises the steps of blanking two metal strips of the same length but less than that of the housing, drawing such strips to produce sections each having a tubular portion at one end and a channel portion at the other with a shoulder connecting such portions, assembling the sections one in reverse relation to the other with the edges of the channel portions in alignment and the outer ends of the channel portions abutting the shoulders upon the other, and welding the sections at their meeting lines to constitute an integral tubular structure.

10. The process of making axle housings, which comprises the steps of blanking two metal strips of the same length but less than that of the housing, drawing such strips to produce sections each having a tubular portion at one end and a channel portion at the other with a shoulder connecting such portions, deflecting the channel portions intermediate their ends to provide a through opening in the housing assembling the sections one in reverse relation to the other with the contacting edges of the channel portions in alignment and the outer ends of the channel portions abutting the shoulders upon the other, and welding the sections at their meeting lines to constitute an integral tubular structure.

11. The process of making axle housings, which comprises the steps of blanking two like contoured metal strips of a length less than that of the housing, drawing such strips to produce sections each having a tubular portion at one end and a channel portion at the other with a shoulder connecting such portions, assembling the sections one in reverse relation to the other with the edges of the channel portions in alignment and the outer ends of the channel portions abutting the shoulders upon the other, and welding the sections at their meeting lines to constitute an integral tubular structure.

12. The process of making axle housings, which comprises the steps of blanking two like contoured metal strips of a length less than that of the housing, drawing such strips to produce sections each having a tubular portion at one end and a channel portion at the other with a shoulder connecting such portions, deflecting the channel portions intermediate their ends to provide a through opening in the housing, assembling the sections one in reverse relation to the other with the contacting edges of the channel portions in alignment and the outer ends of the channel portions abutting the shoulders upon the other, and welding the sections at their meeting lines to constitute an integral tubular structure.

13. The process of making axle housings, which comprises the steps of blanking two like contoured metal strips of the same length but less than that of the housing, drawing such strips to produce sections each having a tubular portion at one end and a channel portion having a projection at the other with an undercut shoulder connecting such portions, assembling the sections one in reverse relation to the other with the edges of the channel portions in alignment and the projections on the ends of the channel portions engaging the undercut shoulders upon the other, and welding the sections on all their meeting lines to constitute an integral tubular structure.

14. The process of making axle housings, which comprises the steps of blanking two like contoured metal strips of the same length but less than that of the housing, drawing such strips to produce sections each having a tubular portion at one end and a channel portion having a projection at the other with an undercut shoulder connecting such portions, deflecting the channel portions intermediate their ends to provide a through opening in the housing, assembling the sections one in reverse relation to the other with the edges of the channel portions in alignment and the projections on the ends of the channel portions engaging the undercut shoulders upon the other, and welding the sections on all their meeting lines to constitute an integral tubular structure.

In testimony whereof, I have signed my name at Milwaukee, this 17th day of May, 1926.

FREDERICK PALM.